(12) United States Patent
Presby (10) Patent No.: US 6,461,078 B1
(45) Date of Patent: *Oct. 8, 2002

(54) PLASTIC SEWAGE PIPE

(76) Inventor: David W. Presby, P.O. Box 617, Sugar Hill, NH (US) 03585

(*) Notice: Subject to any disclaimer, the term of this patent is extended or adjusted under 35 U.S.C. 154(b) by 0 days.

This patent is subject to a terminal disclaimer.

(21) Appl. No.: 09/524,238

(22) Filed: Mar. 13, 2000

Related U.S. Application Data (63) Continuation-in-part of application No. 08/998,351, filed on Dec. 18, 1997, now Pat. No. 5,954,451, which is a continuation-in-part of application No. 08/526,437, filed on Sep. 11, 1995, now abandoned.
(60) Provisional application No. 60/124,706, filed on Mar. 15, 1999.

(51) Int. Cl.⁷ ............................. F16L 9/00; B01D 29/19; B01D 29/60
(52) U.S. Cl. ............................. 405/49; 405/36; 210/170; 210/172; 138/105; 138/121; 138/173
(58) Field of Search ................................. 405/21, 36, 49; 210/170, 172; 138/105, 106, 121, 172, 173

(56) References Cited

U.S. PATENT DOCUMENTS

| | | | | |
|---|---|---|---|---|
| 3,559,692 A | * | 2/1971 | Mantelet | 138/121 |
| 3,583,424 A | * | 6/1971 | Bryant | 138/156 |
| 4,182,581 A | * | 1/1980 | Uehara et al. | 405/43 |
| 4,204,967 A | * | 5/1980 | Bannister | 210/459 |
| 4,303,104 A | * | 12/1981 | Hegler et al. | 138/121 |
| 4,523,613 A | * | 6/1985 | Fouss et al. | 138/121 |
| 4,950,103 A | * | 8/1990 | Justice | 405/43 |
| 5,263,792 A | * | 11/1993 | Davis et al. | 405/52 |
| 5,316,047 A | * | 5/1994 | Kanao | 138/173 |
| 5,716,163 A | * | 2/1998 | Nichols et al. | 405/43 |
| 5,820,296 A | * | 10/1998 | Goughnour | 405/43 |
| 5,954,451 A | * | 9/1999 | Presby | 405/49 |

* cited by examiner

Primary Examiner—Thomas B. Will
Assistant Examiner—Tara L. Mayo
(74) Attorney, Agent, or Firm—George W. Dishong (57) ABSTRACT

Systems for leaching liquid waste, particularly waste water. More particularly a cylindrical conduit or pipe for use in leaching systems. The pipe further has axially directed cuts or apertures in conduit/pipe valleys, has ridges, channels and grooves over which may be laid either single or multiple layers of fabric. The corrugated pipe may have slots or slits or V-grooves in and on the various portions of the pipe such as the outer-facing surface of the ridges, the end portion of the ridges, the side wall of the groove or through the bottom portion of the groove, i.e., the valleys. The cylindrical conduit disperses moisture away from the conduit through capillary action, wicking into a surrounding material. A perforated cylindrical conduit is one method permitting wicking. The surrounding material provides capillary action to transmit moisture away from the cylinder or conduit. These surrounding materials include sand, gravel, plastic fibers, wood products, slag, and ash. A fabric or other material may surround the cylindrical conduit. For septic systems, this includes any gravel-less systems such as the SB2, Environ-Septic® and Geo-Flow® systems. Other applications of this invention include treatment of oil-contaminated water and chemically contaminated water, in addition to septic tank effluent.

20 Claims, 6 Drawing Sheets

PLASTIC SEWAGE PIPE

This application claims the benefit of U.S. Provisional Application No. 60/124,706, filed Mar. 15, 1999. This application is a continuation-in-part, of application Ser. No. 08/998,351 filed on Dec. 18, 1997, now U.S. Pat. No. 5,954,451 issued Sep. 21, 1999 which is a continuation-in-part of application Ser. No. 08/526,437 filed on Sep. 11, 1995 now abandoned.

BACKGROUND OF THE INVENTION

1. Field of the Invention

This invention relates to systems for leaching liquid waste, particularly waste water. More particularly this invention relates to a specially designed cylindrical conduit or pipe for use in leaching systems. Even more particularly the invention relates to cylindrical conduit which has specially configured ridges, channels and grooves over which may be laid or wrapped, either single or multiple layers of fabric. And further the corrugated pipe disclose herein may have slots or slits or V-grooves in and on the various portions of the pipe such as the outer-facing surface of the ridges, the end portion of the ridges, on any or all surfaces forming the channels between the ridges, the side wall(s) of the groove or through the bottom portion of the groove, the valleys, and any combination of the above listed possibilities. Such slits, slots or V-grooves may be used with fabric or without fabric covering of the pipe and with or without the apertures in the valley portion of the corrugated pipe. Additionally, slits, slots, V-grooves may be used with smooth-walled pipe as opposed to corrugated types of pipe. In each instance, the pipe may be used to effectively process effluent in a leaching system.

The cylindrical conduit disperses moisture away from the conduit through capillary action, wicking into a surrounding material. A perforated cylindrical conduit is one method permitting wicking. The surrounding material provides capillary action to transmit moisture away from the cylinder and prevents the effluent from traveling directly from the pipes of the upper level to the conduits of the lower levels. Examples of these materials include sand, gravel, plastic fibers, wood products, slag, and ash. A fabric or other material may surround the cylindrical conduit. For septic systems, this includes any gravel-less systems such as the SB2, Enviro-Septic® and Geo-Flow® brands of gravel-less septic waste processing systems. Other applications of this invention include treatment of oil-contaminated water and chemically contaminated water, in addition to septic tank effluent.

Even more particularly, the invention is particularly useful in combination with the septic tank maze apparatus defined and described in Applicant's U.S. Pat. No. 5,429,752 Issued Jul. 4, 1995 and incorporated herein by reference, and with the use of multiple layers of fabric of varying deniers. With the selection of fabric, fabric properties such as denier, thickness, retention quality such as hydrophobic or hydrophihc characteristics, specific fluid treatment objectives can be met. The multilayer fabric provides boundaries/interfaces and regions within which specifically chosen bacteria, chemicals, microbes and the like may be introduced to facilitate the biodegradation of specifically chosen undesirable materials. The performance of the conduit of the invention is further improved over the currently known leach fields when it is used in combination with single or multiple layers of fabric covering.

2. Description of the Prior Art

Many drainage pipes are produced from plastic materials, either by extrusion or blow molding, with the pipe being cut into lengths or rolled on a large drum to be carried in the field. To obtain high rigidity and maximum utilization of material, such drainage pipes are commonly corrugated with the corrugations extending circumferentially around the pipe. Corrugated plastic pipe is widely used for many types of domestic, agricultural, and industrial drainage and waste disposal systems.

Preferably, drainage holes are positioned in the wall of the inner corrugation so that, when the pipe is ultimately buried in the earth, the drainage holes are not packed as tightly as would be the case if they were positioned in the outer corrugation. Having the perforations on the inner corrugation facilitates drainage from the pipe, but, for obvious reasons, complicates the formation of the perforations.

It would be advantageous to have corrugated pipe with grooves which are deeper and which grooves have sidewalls which are substantially perpendicular to the bottom surface of the groove and perpendicular to the outer or top surface of the pipe. Because of the manner in which such pipe is perforated at the bottom surface of the grooves it has not been possible to make such a desirable corrugated pipe as taught herein. Applicant's U.S. Pat. No. 5,606,786 Issued Mar. 4, 1997 and incorporated herein by reference, for "Apparatus and Method for Producing Pipe and Pipe Produced Thereby" teaches a machine and method for producing such desirable pipe.

It should be further pointed out that suspended solids have plagued the septic system and waste water treatment industry more in the last ten (10) or more years than in previous years. The increase in the problem is due in part to the evolution and development of some of the modem day cleaners which now make cleaning easier in that they cause grease and oil to dissolve into the water. The major problem with the septic tank is that the suspended solids in passing through the tank neither cool nor make contact at a slow enough pace to separate from the water.

Lint and fuzz has also been an ongoing problem for the septic tank to control. This material stays suspended in the septic tank liquid and normally passes through, remaining suspended in the effluent which subsequently also causes problems in the leach system connected with the septic tank.

Septic tanks generally available do not effectively provide for the removal, in a manner which does not effect the cost and the performance characteristics of the septic treatment system, of suspended solids that are typically found in septic tank liquid. It is important that the amount of suspended solids that leave the treatment tank be minimal so as not to adversely affect the subsequent treatment of the waste water/effluent. A leach field, for example, is adversely effected because the suspended solids will clog receiving layer and also adversely affect the absorption characteristics of the leach bed.

Currently there are designs and equipment that attempt the removal of the suspended solids. All of those known to the inventor of the now patented precipitation apparatus defined in U.S. Pat. No. 5,429,752 have failed to address the problem in an efficient manner because all the efforts attempt to "filter" the liquid. Filtration creates an additional set of problems. The filters can quickly become plugged slowing down or completely blocking the flow through of the liquid through the treatment tank. The filters are expensive and are costly to maintain. Applicant's patented precipitation apparatus greatly reduces the level of suspended solids exiting the treatment tank and entering the leach system.

It would be advantageous to have a treatment system which would include a leach system which would, more efficiently and effectively process the leachate or effluent from the septic tank or precipitation apparatus. The obvious consequences of such an improved fluid conducting conduit structure for use within a drainage field, would be longer life, less area needed to handle a specific amount of outflow of liquid and a cleaner and safer treated liquid returning to the environment. The improved fluid conducting conduit structure defined and claimed herein provides these advantages without a large increase in cost, does not require any additional maintenance and, in fact, requires less maintenance, is incorporatable into standard treatment designs and configurations, would be easily installed as new or replacements into existing and in-place leach fields and would provide flexibility to incorporate a variety of specially designed uses to result in a custom system based upon special or specific needs within the treatment system.

There is nothing currently available which satisfies these needs and objectives. However, the invention disclosed herein does meet all of these objectives.

The following patents relate to the technology of the present invention but none of them meets the objects of the disclosed and claimed improved system in a manner like that of the instant invention. Additionally none are as effective and as efficient as the instant improved conduit system.

U.S. Pat. No. 3,976,578 to Beane discloses a protective sleeve for corrugated drainage tubes. The protective sleeve is a continuous tubular sleeve of knit fabric material which is slipped over one or more sections of corrugated flexible drainage pipe and acts as a filter to keep rocks, dirt, mud, pieces of clay, and the like from clogging the openings in the corrugated drainage pipe while allowing the water to pass through. Disclosed is a knit fabric preferably formed by lock stitches and is inherently elastic.

U.S. Pat. No. 4,909,665 to Caouette discloses a fabric wrapped corrugated structure. The fabric wrapping comprises an outer fabric combined with a grid mesh separation element. It is disclosed that the fabric may be of the woven or non-woven type and that the fabric may be bonded to the grid mesh. Further, Caouette discloses that the grid mesh may take many different forms as long as one set of cross members or other members such as dimples on a planar structure or fibrous material provides some separation of the fabric above the peaks of the corrugated pipe.

U.S. Pat. No. 5,224,832 to Gonczy et al. discloses a multilayer insulation blanket used in heat transfer technology which can be wrapped around a structure. The Gonczy patent does not disclose the use of multilayer fabrics of varying deniers and does not disclose the liquid permeability of the multilayer blanket.

U.S. Pat. No. 4,288,321 to Beane discloses a drain tile and a pile fabric filter sleeve. The knit fabric of the '321 patent to Beane is provided over the drainage conduit to facilitate efficient liquid flow. The knit fabric is also impregnated with suitable chemical agents for counteracting anticipated chemical reaction particle intrusions. The knit fabric is further disclosed to be formed of stitches defining a ground and defining terry loops extending from the ground and being directed in a predetermined generally radial direction relative to the longitudinal axis of the drainage conduit.

U.S. Pat. No. 4,904,113 to Goddard et al. discloses a highway edgedrain. The edgedrain comprises a tube inserted into a fabric sheath. The fabric sheath of the '113 patent is preferably of a nonwoven fabric and of a geotextile composition. The sheath acts a filter to prevent the passage of large particles or rocks into the tube. Further the sheath is disclosed as being made from a material of a single density.

U.S. Pat. No. 4,662,778 to Dempsey discloses a drainage mat. Most significantly, the '778 patent discloses a drainage material with extended surface which is a two-layer composite of polyester non-woven filter fabric heat bonded to an expanded nylon non-woven matting such as ENKADRAIN™ brand of three-dimensional composite.

U.S. Pat. No. 5,002,427 to Kambe et al. discloses a hydrophobic material used for drainage of a culvert. The '427 patent discloses a textile or knit fabric having large and small mesh portions.

The patents noted herein provide considerable information regarding the developments that have taken place in this field of technology. Clearly the instant invention provides many advantages over the prior art inventions noted above. Again it is noted that none of the prior art meets the objects of the sewage pipe as used in septic and waste water treatment in a manner like that of the instant invention. None of them are as effective and as efficient as the instant combination of multilayered fabric and corrugated pipe combination for use in the management of effluent drainage systems.

While simply the use of the pipe as taught in the present disclosure provides many advantages over the currently known and commonly used corrugated pipe, the additional use of multilayers of fabric provides one with the advantage to have a medium for different types of bacteria to collect on and break down on as well as divide them by particle size. All prior systems have structures with members which are pressed tightly against the pipe itself, causing shadowing to take place where the fabric touches the pipe or the members. By using multilayers of fabrics starting with the very coarse denier working down to a fine denier, one is able to alleviated all of the shadowing effect which has never before been achieved. At the same time, larger particles are being sorted or separated from smaller particles, allowing the bacteria in the effluent to work more efficiently on these particles.

It is also important to note that with the use of the multilayer fabric, liquids will be diffused/dispersed without channeling the liquids in a forced direction adding considerably to the life of any septic system.

Some particular aspects of interest for the fabric wrapped corrugated pipe invention are:
1. Longer life and no shadow effects;
2. Less masking;
3. More storage and breakdown area within the fabric layers;
4. Different grades of bacterial area;
5. Different interfaces for bacteria;
6. The division of different types of material;
7. Less clogging;
8. Septic use and floor drain use;
9. May be used over valley with any material that gives spacing and may also be used over smooth wall pipe;
10. May be used on incoming/outgoing liquids, that is the process would work for liquid moving from within to without the pipe or moving from without to within;
11. Any pretreatment of surface or subsurface fluids to include trapping collecting or dispersing fluids into and out of the ground;
12. Fabric may be pretreated with chemical, bacteria and/or combinations such pretreatment may be specific for applications such as oil-spill or the like;

13. Multi-layered fabrics and different deniers and different thicknesses may be combined again to achieve specific functions;
14. Treating liquids on the inside, trapping things inside—different fabrics exhibit retaining properties relative to specific materials and likewise different materials have varying treatment properties for different substances such as oil and effluent;
15. At all of the interfaces of the multilayered fabric and at the interface of the fabric with the conduit surface and the soil, fluids are being treated in a progressive manner resulting in a treated fluid having an acceptable standard of quality.
16. May be used on corrugated or smooth-walled structures or any fluid-carrying structure that passes fluids through itself or through holes/slots/cuts over/under/through/around.

SUMMARY OF THE INVENTION

This invention most generally relates to a device/apparatus for using a multilayer fabric of varying deniers for the processing and treatment to fluids which must be treated to remove materials so that the resultant treated fluid may be reused and/or returned to the earth and particularly to the water table. More particularly the invention relates to the use of multilayer fabric, each layer being of selected denier, in combination with conduit, either smooth-walled or corrugated, in a drainage field or leaching system usually associated with a septic tank or system. Even more particularly, each layer of the multilayer fabric of varying deniers has a coarseness or denier different from the coarseness or denier of all adjacent layers, and may be wrapped around corrugated plastic pipe of the type well known in the field of drainage or leaching fields. Additionally, the fabric layers may be pretested with chemicals, bacterial, and/or microbes such as known oil digesting microbes in order to particularize the use of the apparatus in the processing or treating of fluids. Most particularly the invention relates to cylindrical conduit which has specially configured ridges, channels and grooves over which may be laid either single or multiple layers of fabric. And further the corrugated pipe disclosed herein may have slots or slits or V-grooves in and on the various portions of the pipe such as the outer-facing surface of the ridges, the end portion of the ridges, the side wall of the groove or through the bottom portion of the groove. The pipe may be used to effectively process effluent in a leaching system.

An object of the invention is to provide an apparatus easily and economically maintainable and which is effective to process liquid outflowing from a septic tank or treatment tank and cause the outflow liquid or effluent to be more efficiently and more effectively processed and the processed liquid returned to the ground water system.

A further object of the invention is to provide an apparatus which is easily and economically adaptable to meet specific design criteria which are based upon types and quantity of suspended solids found or expected in a treatment system and which, when in use, will increase the life expectancy of a leaching system and reduce the normal area of a leach system.

A still further object of the invention is to provide an apparatus which because of its use reduces ground water contamination.

A yet still further object of the invention is to provide an apparatus for use within a drainage field, which drainage field is in combination with disposal and irrigation systems used in treatment of fluids and dispersal of fluids, the structure comprising: corrugated conduit having an outer surface of a plurality of peaks and valleys and a plurality of perforations located circumferentially within each of the valleys. Each of the plurality of perforations provides flow communication from conduit interior to conduit exterior. There is also a first layer of fabric wrapped around the outer surface of the corrugated conduit; and at least one additional layer of fabric overlaying the first layer with, the first layer and each of the at least one additional layer of fabric having a predetermined denier and predetermined thickness. The predetermined denier of the first layer is greater than the predetermined denier of each of the additional layers of fabric and each of the additional layers has a denier different from each of the additional layer adjacent thereto. The predetermined denier and thickness is dependent upon the fluid being treated and dispersed and the drainage field size, composition and geometry. The first layer and the at least one additional fabric layers are formed from an unstructured assemblage of fibers. The unstructured assemblage of fibers is typically supported by an outer sheeting. Oils, greases and chemicals contained in the fluids to be treated and entering within the fluid conducting conduit structure are entrapped within at least one of the first layer and the at least one additional layer of fabric on the unstructured assemblage of fibers. The unstructured assemblage of fibers provides a surface area wherein consequent biodegradation of the oils, greases and chemicals takes place permitting treated fluid to pass omnidirectionally through the unstructured assemblage of fibers and subsequently leach into the ground.

A primary object of the invention is to provide an improved fluid conducting conduit structure for use within a drainage field, which drainage field is in combination with disposal and irrigation systems used in treatment of fluids and dispersal of fluids, using conduit having an outer surface and having a plurality of perforations in the outer surface to the interior or the conduit and located at predetermined locations along an axis of the conduit. The improvement comprises: a first layer of fabric wrapped around the outer surface of the conduit; and at least one additional layer of fabric overlaying the first layer with the first layer and each additional layer of fabric having a predetermined denier and predetermined thickness. The predetermined denier of the first layer is coarser than the predetermined denier of each additional layer of fabric. While the predetermined denier of the first layer is greater than the predetermined denier of each additional layer of fabric, each additional layer simply has a denier that is different from each additional layer adjacent thereto. The predetermined denier and thickness is dependent upon the fluid being treated and dispersed and the drainage field size, composition and geometry. At least one of the layers of the multilayer fabric is/are formed from an unstructured assemblage of fibers. The unstructured assemblage of fibers is supported by an outer sheeting. Oils, greases and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of the oils, greases and chemicals takes place, thereby permitting treated fluid to pass omnidirectionally through the unstructured assemblage of fibers and subsequently leach into the ground.

Another primary object of the invention is to provide the improved fluid conducting conduit structure with conduit which is plastic material.

Yet another primary object of the invention is to provide the improved fluid conducting conduit structure where the outer surface has a plurality of dents and detents spaced around outer surface resulting in a reduction of the outer surface area contacting the first layer of fabric.

A further object of the invention is to provide the improved fluid conducting conduit structure where at least one of the layers of fabric is pretreated with at least one composition selected from the group consisting of oil digesting microbes, Rid-X® brand of septic treatment by Reckitt & Coleman Inc., Drain Care Enforcer® Products, Inc. brand of septic tank treatment, K37 Roebic Septic Tank Treatment, K57 Cesspool Cleaner both by Roebic Laboratories, Inc.

A still further object of the invention is to provide the improved fluid conducting conduit structure for use within a drainage field using corrugated conduit having an outer surface of a plurality of peaks and valleys and having a plurality of perforations located circumferentially within each valley region. The corrugated conduit is preferably comprised of plastic material and wherein each of the peaks have a plurality of dents substantially equally spaced around each peak resulting in a reduction of outer surface area of the conduit contacting the first layer of fabric.

A particular object of the present invention is to provide a method for subterranean leaching and treating of outflow effluent from a septic system. The method for subterranean leaching comprises the steps of; wrapping corrugated conduit having a plurality of peaks and valleys and having a plurality of perforations located circumferentially within each valley region with a first layer of fabric, overlaying the first layer with at least one additional layer of fabric. The first layer and each one of the additional layers of fabric have a predetermined denier and predetermined thickness. The predetermined denier of the first layer is coarser than the predetermined denier of each additional layer of fabric. Any further layers each have denier or coarsenss levels different from the coarseness of adjacent layers. The covered corrugated conduit are then placed end-to-end connected within trenches positioned according to a specific design of a leaching field. Flow connection is provided between an outflow aperture of the septic system and an inflow aperture of the covered corrugated conduit. The entire structure is covered over with soil.

Another particular objective of the invention is to provide corrugated pipe specially configured with channels and ridges, deep sidewalls not quite perpendicular to the channels and ridges and to the base of the groove but the relatively steep angle adds strength to the pipe and does not negatively effect the flexibility of the pipe.

Yet another particular objective of the invention is to provide corrugated pipe specially configured as above but further having slots or slits or V-grooves or combinations of such perforations in and on the various portions of the pipe such as the outer-facing surface of the ridges, the end portion of the ridges, on any or all surfaces forming the channels between the ridges, the side wall(s) of the groove or through the bottom portion of the groove and any combination of the above listed possibilities. Such slits, slots or v-grooves may be used with fabric or without fabric covering of the pipe and with or without the apertures in the valley portion of the corrugated pipe. Additionally, slits, slots, v-grooves may be used with smooth-walled pipe as opposed to corrugated types of pipe. In each instance, the pipe may be used to effectively process effluent in a leaching system.

These and further objects of the present invention will become apparent to those skilled in the art to which this invention pertains and after a study of the present disclosure of the invention.

DESCRIPTION OF THE PREFERRED EMBODIMENTS

The following is a description of the preferred embodiment of the invention. It is clear that there may be variations in the size and the shape of the pipe, in the materials used in the construction and in the orientation of the channels, ridges, slits, slots or V-grooves. However, the main features are consistent and the particular objectives, features and advantages are:

1) The shape of the channels and ridges are such that they may run diagonally—the angle not being critical, or the channels and ridges may go straight across the peak of the pipe outer surface.
2) Due to the ridges and channels on the peak of the pipe outer surface, the outer surface of the pipe is caused to be strengthened substantially in a manner similarly to the building girders on a bridge.
3) The shape of the channels and the ridges results in less mask or shadows surface where the pipe comes in contact with the outer fabric covering.
4) The depth of the sidewalls not only adds strength to the pipe itself, but leaves room to notch the pipe at the base of the grooves resulting in little if any lose in strength of the pipe as a consequence of the cutting away of a small portion of the sidewall of the grooves.
5) The depth of the sidewall and the narrowness of the groove allow the inside storage of the pipe to be tremendously increased—i.e., more sludge can be stored inside of the pipe.
6) The angle of the sidewalls is not quite perpendicular to the channels and ridges and to the base of the groove but the relatively steep angle adds strength to the pipe and does not negatively effect the flexibility of the pipe.
7) At least in part due to the shape of the pipe, the wall thickness may be thinner and still have greater strength than similar culvert pipe with conventional corrugation.
8) The channels and ridges are designed so that the fabrics will not sag deep enough into the channels to cut off the flow of liquids. They are also extended far enough so that there is no cut off of liquid flow where the fabric sags into the groove.
9) Where perforations of the types of slots, slits, V-grooves and the like or combinations of such are located in one or a variety of locations on the pipe, the need for use of fabric covering is reduced but the effectiveness of the pipe which such perforations is substantially retained.

Where there is a fabric covering used with the pipe there are the following advantages:

1) Multiple layers of fabric rather than screens are used;
2) Fabric layers of varying deniers and/or thickness may be used;
3) With the selection of fabric and fabric denier, specific fluid treatment objectives can be met;
4) The multilayer fabric provides boundaries/interfaces and regions within which specifically chosen bacteria, chemicals, microbes and the like may be introduced to facilitate the biodegradation of specifically chosen undesirable materials; and
5) Improved performance over the currently known leach fields.

It is clear that in the description provided below relative the the aspects of the technology of septic effluent processing which are described in FIGS. 1–7, everything described herein is applicable and advantageous for use with the corrugated pipe as disclosed in FIGS. 8, 9 and 10—the corrugated pipe which is substantially the subject of the instantly disclosed invention.

Detailed Description of the Multilayer Fabric

While the layers of the multilayer fabric are characterized in terms of denier—the higher the number the more coarse the character of the fabric, it is obvious that, based upon the application of invention 10 or 10a, the degree of coarseness and the denier may range from the lowest of value to the highest of value for commercially available fabrics. The material fibers from which the fabric is made may also vary and the choice of fabric having different fiber material will be a function of the type of impurities within the fluid being treated as well as the flow rate and volume of fluid to be treated. Appropriate fabrics are available from TerraTex, Inc. such as TerraTex SD or TerraTex N04, with a mass per unit area of 4.5 and 4.0 oz per square yard respectively. Examples of fabrics which may be useful as layer 12a for treatment of fluid from within conduit 14 or 15 to outside structure 10 or 10a are: Contech Construction Products, Inc. brand of erosion-control products such as, Contech ECRM C-45, ECRM C-50 having an area density or a mass per unit area of 10 oz per square yard and 12 oz per square yard respectively and a denier of 450 and 500 respectively. BonTerra America, Inc. has a number of fabrics which may be used. Again, by example only SFB has similar characteristics to ECRM C-45 but the denier is about 300. Examples of fabrics which may be useful as any or all additional layers 12b for treatment of fluid from within conduit 14 or 15 to outside structure 10 or 10a are: American Engineering Fabrics, Inc. brand of erosion-control products such as the fabrics with product names, AEF 480, AEF 480 HS, AEF 680, AEF 680 HS having an area density or a mass per unit area of 4, 4, 6 and 6 oz per square yard respectively. The apparent opening size for all of these fabrics is between about 70 and 140. North American Green, Inc. also has a line of products which are useful in makeup of multilayer fabric 12. P300p has an area density or a mass per unit area of 12.8 oz per square yard and would be useful as first layer 12a for fluid going from within a pipe to outside of the pipe or as layer 12b when the fluid being processed or treated in coming into the pipe or conduit.

Regarding the layers of the multilayer fabric, it is important to note that at least one of the layers are formed from an unstructured assemblage of fibers. The unstructured assemblage of fibers are supported by an outer sheeting. Oils, greases and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of said oils, greases and chemicals takes place permitting treated fluid to pass omnidirectionally through the unstructured assemblage of fibers and subsequently leach into the ground.

Where the fluid to be treated comes from outside structure 10 or 10a to inside conduit 14 or 15, the fabrics identified for 12a would be layer 12b and those identified for layers 12b would be used for layer 12a. Where there are more than two (2) layers, it is important to note that each additional layer has a denier different from each additional layer adjacent thereto. In other words, where fluid is moving from inside to outside, first layer 12a will be more coarse than the coarseness of layer 12b. Another layer over layer 12b need only have a level of coarseness different than that of layer 12b. Further, if yet another layer was added, it is only necessary that the coarseness of that layer be different from the layer adjacent.

Detailed Description of the Multilayer Fabric Used with a Conduit Structure

Reference is now made to FIGS. 1–5 all of which illustrate by sketch particular embodiments and features of the present invention when used to treat fluid which is contaminated from use and return the treated fluid to the water table.

Figure 1:
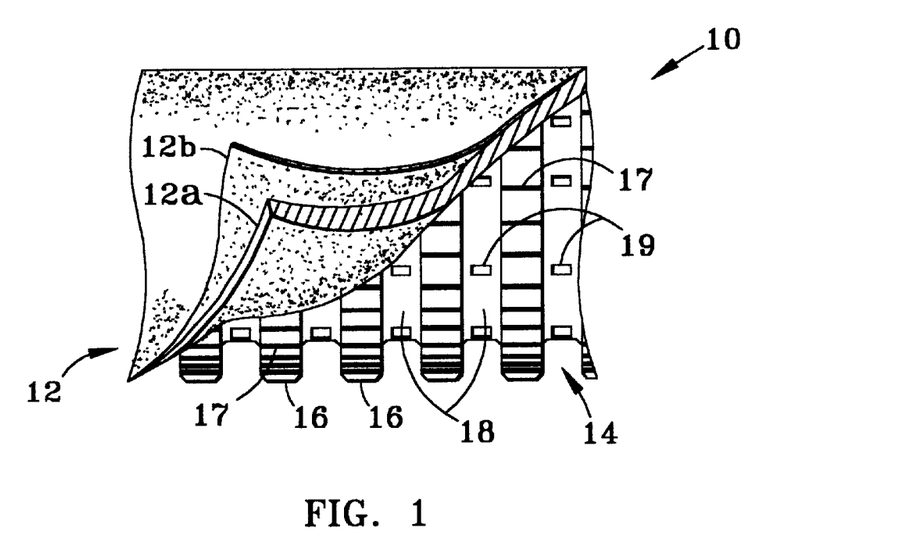
FIG. 1 is a schematic illustration of the invention showing multilayer fabric of varying deniers wrapped around corrugated pipe with a portion of the fabric cut-a-way thereby disclosing a plurality of dents or detents on the peaks of the pipe and disclosing a plurality of perforation in the valleys of the pipe.
Figure 2:
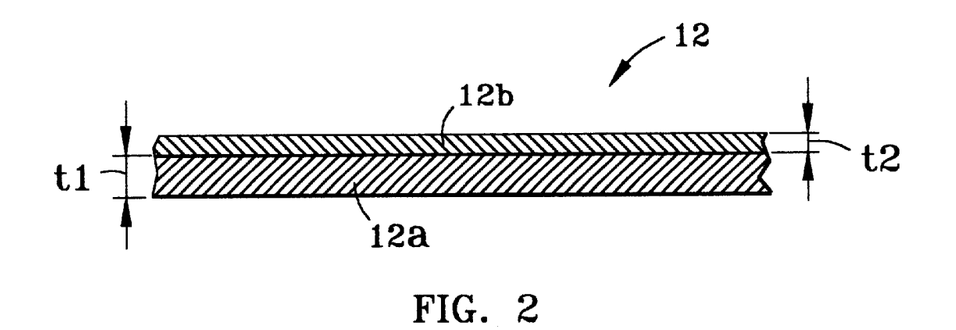
FIG. 2. is an edge view of the multilayer fabric having two layers and illustrating the fabric layer interface.
Figure 3:
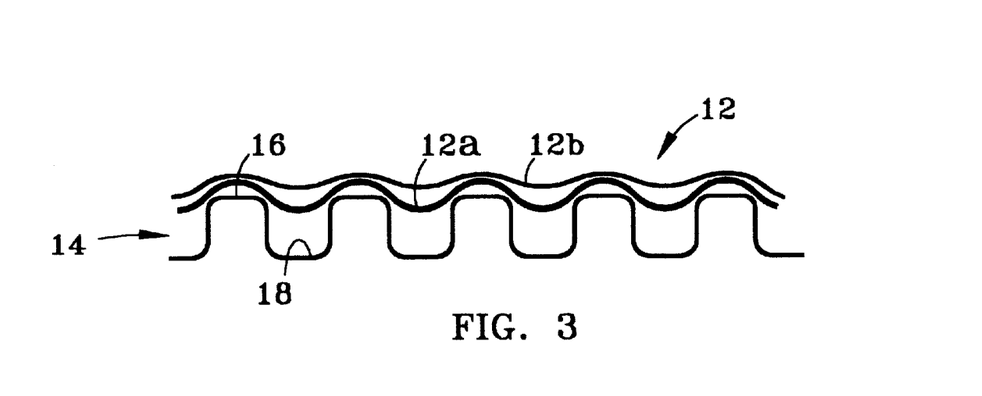
FIG. 3. is a side view schematic and partial cross section illustration of corrugated pipe having wrapped thereon two layer multilayer fabric.

In FIGS. 1–3 a schematic illustration of improved fluid conducting conduit structure 10 showing multilayer fabric 12. Multilayer fabric 12 has a first layer of fabric 12a of specific denier X and thickness $t_1$ second layer of fabric 12b of specific denier Y<X and thickness $t_2$. Where there are more than two (2) layers, it is important to note that each additional layer has a denier different from each additional layer adjacent thereto. In other words, where fluid is moving from inside to outside, first layer 12a will be more coarse than the coarseness of layer 12b. Another layer over layer 12b need only have a level of coarseness different than that of layer 12b. Further, if yet another layer was added, it is only necessary that the coarseness of that layer be different from the layer adjacent. Multilayer fabric 12 is wrapped around corrugated conduit 14. A portion of fabric 12 is cut-a-way thereby disclosing a plurality of dents or detents 17 on the peaks 16 of conduit 14 and disclosing a plurality of perforations 19 in valleys 18 of conduit 14. The fabric layer interface of multilayer fabric 12 having two layers, a first layer 12a and one additional layer 12b is illustrated in FIG. 2.

Figure 4:
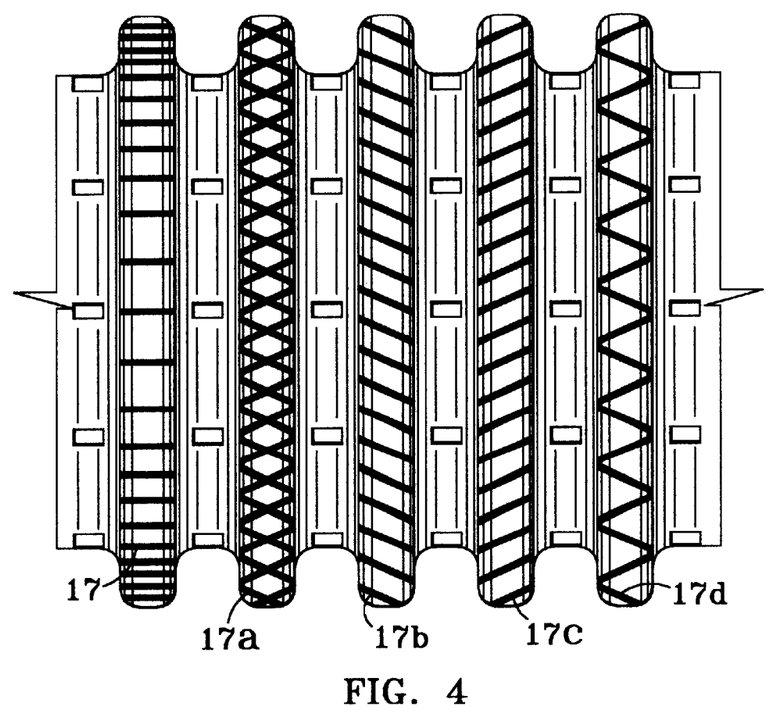
FIG. 4 is a schematic illustration used only to disclose various geometries of dents or detents on the peaks of the pipe and further illustrating that the perforation in the valleys may be slots rather than circular perforations.

It is important to note that where corrugated conduit of the type identified by numeral 14 is used, peaks 16 may have different geometries of detent or dents placed around each of the peak surfaces. Some of these different geometries of dents 17, 17a, 17b, 17c and 17d are shown in FIG. 4. They are all shown on the same section of conduit peaks 16 for reasons of convenience only. It is further noted that perforations 19 need not be circular. In fact Applicant has developed an improved method for putting perforations 19, which may be slots rather than circular in shape into valleys 18 of conduit 14.

Figure 5:
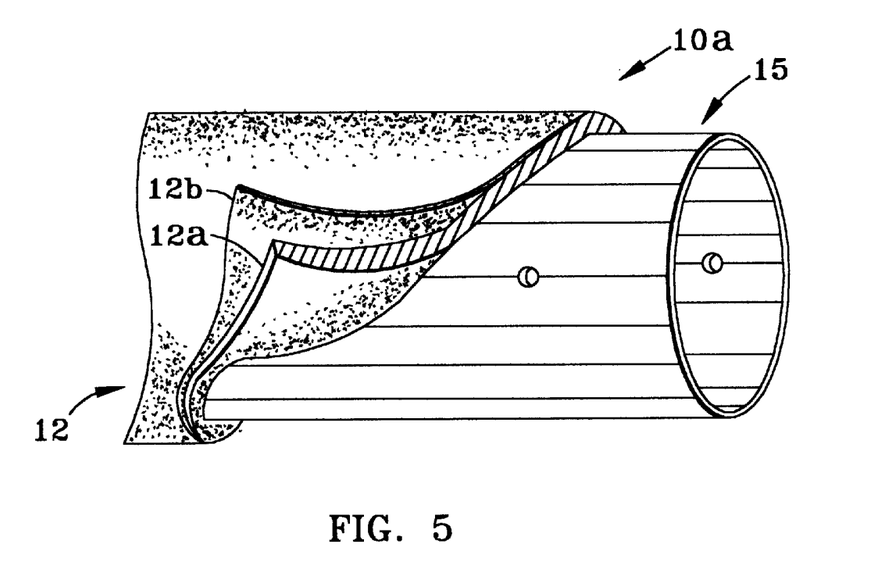
FIG. 5 is a schematic illustration of the invention showing multilayer fabric of varying deniers wrapped around smooth-walled pipe with a portion of the fabric cut-a-way thereby disclosing a plurality of dents or detents or scorrings on the outer surface of the pipe and representatively illustrating a plurality of perforation in the wall of the pipe.

While a preferred embodiment of an improved conduit is of the type identified in FIGS. 1, 3 and 4 and which figures illustrate such conduit or pipe for use with fabric, it is clear that multilayer fabric 12 of varying deniers may be wrapped around smooth-walled perforated conduit/pipe 15 resulting in improved conduit 10a. Likewise, fabric 12 may be wrapped around pipe configured according to the pipe of the present invention illustrated by FIGS. 8, 9 and 10. FIG. 5 illustrates only representative number of perforations 19a. With a portion of fabric 12 cut-a-way a plurality of dents or detents or scorrings 17a is disclosing on the outer surface of pipe 15. The preferred material for use as "fabric" is the North American Green® brand of flexible channel liners. Particularly preferred is the type identified as P300P made of 100% UV stabilized polypropylene fiber matrix sewn between an extra heavy duty UV stabilized top net and heavy UV stable bottom net. The P300P is non-degradable mattings designed to provide temporary protection of high-discharge channels and shorelines during vegetation establishment and permanent reinforcement of the vegetable stand after maturity. The fibers are 0.7 lbs./sq.yd and the net is extra heavyweight UV stabilized. The thread is black polyester. Another preferred material for use as "fabric" is the LandLok Soil Erosion Green® brand of soil erosion mat. Particularly preferred is the type identified as product number 450G made by Synthetic Industries. As is apparent from the description of the manufacturer's description of the use of the material, use with septic leach field pipe was not ever contemplated.

Figure 6:
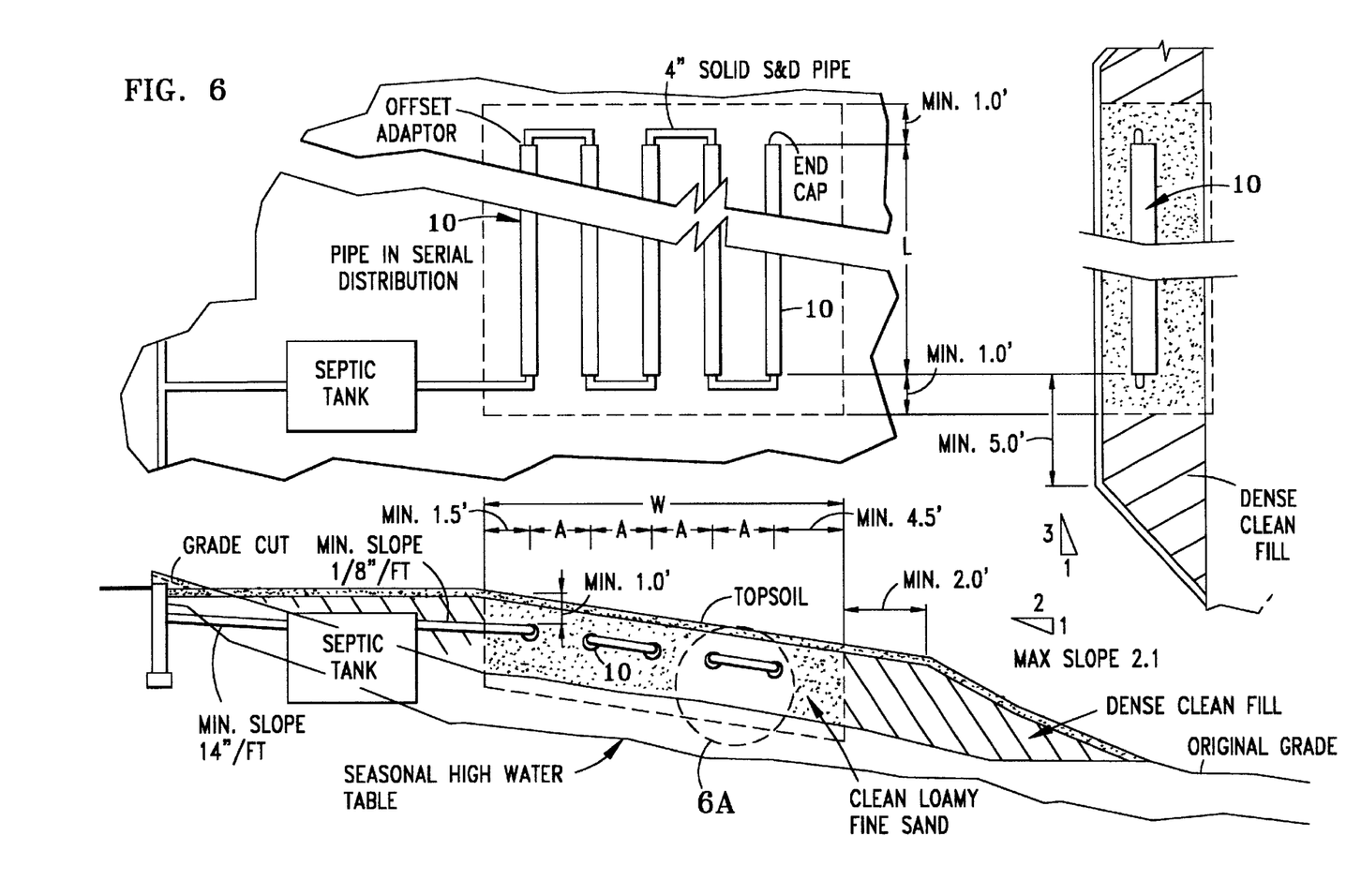
FIG. 6 is an exemplary design layout of a septic system illustrating the use of the invention, serially connected within a leach field having a slope.
Figure 6A:
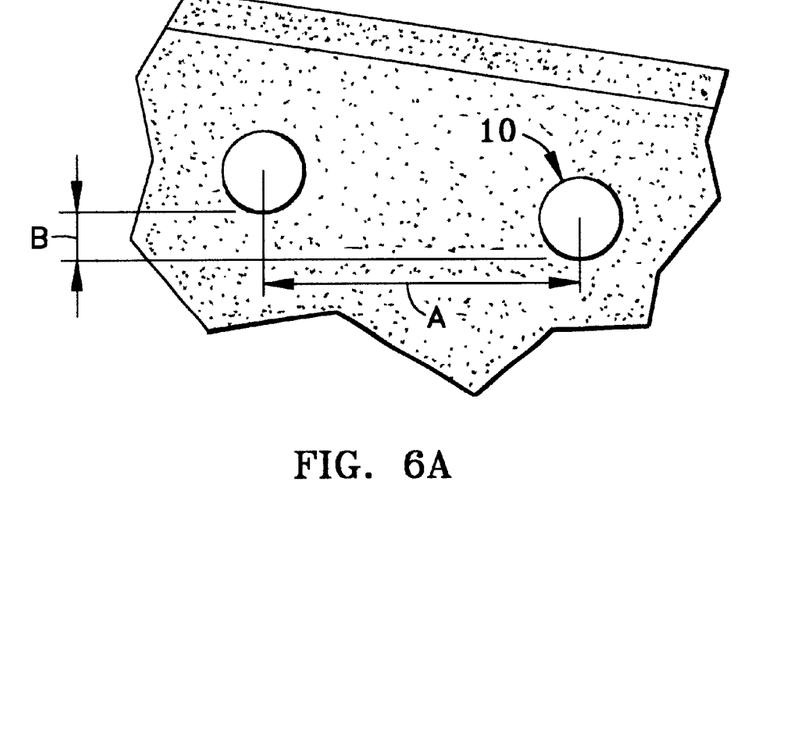
FIG. 6A is an enlargement of the interconnected wrapped conduit structure as used in a leaching system.

In describing the method for treating septic fluids using improved conduit 10 or 10a, reference may be made to FIG. 6 which depicts an exemplary design layout of a septic system illustrating the use of invention 10 or 10a, serially connected within a leach field having a slope. The method comprises the steps of: wrapping corrugated conduit, having a plurality of peaks and valleys and having a plurality of perforations located circumferentailly within each valley region, with a first layer of fabric. Overlaying the first layer with at least one additional layer of fabric, the first layer and each of the at least one additional layer of fabric having a predetermined denier and predetermined thickness. The predetermined denier of the first layer is different than the predetermined denier of each additional layer of fabric and each additional layer has a denier different from each additional layer adjacent thereto. The predetermined denier and thickness is dependent upon the fluid being treated and dispersed and the drainage field size, composition and geometry. The first layer of fabric is formed from an unstructured assemblage of fibers. The unstructured assemblage of fibers is supported by outer sheeting where oils, greases and chemicals contained in the fluids to be treated and entering within the fluid conducting conduit structure and are entrapped within at least the first layer and at least one additional layer of fabric particularly on the unstructured assemblage of fibers. The unstructured assemblage of fibers provides a surface area wherein consequent biodegradation of the oils, greases and chemicals takes place permitting treated fluid to pass omnidirectionally through the unstructured assemblage of fibers and subsequently leach into the ground. The covered corrugated conduit is then placed within trenches positioned according to a specific design of a leaching field. Flow connection is then provided between an outflow aperture of the septic system and an inflow aperture of the covered corrugated conduit. Soil is then placed over the entire structure.

Figure 7:
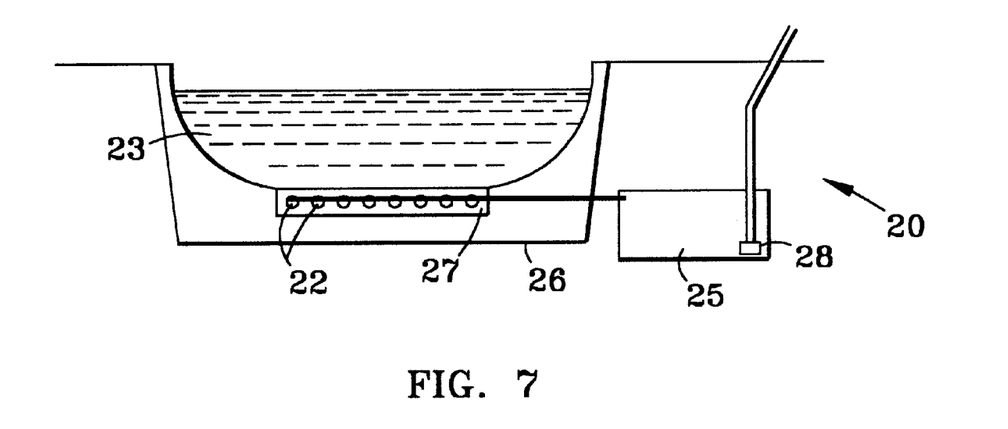
FIG. 7 is a schematic illustration of the invention showing multilayer fabric wrapped around a conduit so as to permit cleaning of contaminated fluid coming into a pipe or conduit wrapped or covered with a multilayer fabric.

FIG. 7 is an a schematic illustration of the invention 10 or 10a showing multilayer fabric 12 wrapped around conduit 14 or 15, the combination or combinations of elements 10 or 10a, 12 and 14 or 15 which are identified in FIG. 7 as element 22, so as to permit cleaning of contaminated fluid coming into such a pipe or conduit 14 or 15 so that it is possible to take water that has been contaminated and may be held in holding area 23 (areas of contaminated soil) and pass it through multilayer fabric 12. Properly pretreated layers 12a and/or 12b of multilayer fabric 12 could initiate bacterial growth on the outer surface or remove oil and grease and have cleanerwater as it goes in system 20. It would be effective in the removal of oils, greases and other chemicals. Where fluid to be treated is entering improved conduit 10 or 10a from the outside, the layer of fabric 12a in contact with pipe 14 or 15 would have a denier which is less than the denier of additional/outer layers 12b of multilayer fabric 12. Recovered, treated fluid from holding area 23 is passed into treated fluid holding tank 25. Liner material 26 holds both a bed of sand 27 covering the entire septic system structure, and any escaping fluid. There is also provided a means for pumping 28 which pumps treated fluid from treated fluid holding tank 25 so that the treated fluid may be reused and/or returned to the earth, particularly the water table.

Additives may be incorporated into any one or all of the layers of multilayer fabric 12. Rid-X® brand of septic tank additive may be use to improve the biodegradation of the effluent. Additional to Rid-X® brand of septic treatment by Reckitt & Coleman Inc., Drain Care Enforcer® Products, Inc., K37 Roebic Septic Tank Treatment, K57 Cesspool Cleaner both by Roebic Laboratories, Inc. are examples of other products useful with the invention hereof. BOOM™ has available sorbent material which is effective in the clean up of oil spills. By incorporating pads such as product A-200H or A-200LF or A-200U or A-300 within layers of multilayer fabric 12, fluids containing oil based contaminants would be most effectively treated by improved conduit 10 or 10a. 3M Company makes a sorbent in roll form. WX-15239 is representative of product which also could be incorporated into the instant fabric 12.

The use of multiple layers of fabric results in a substantial increase in the efficiency of bacterial treatment of effluent. The increase in bacterial growth and treatment of effluent has been found to be four to six time faster than found in a single layer system. Each layer of surface separates different materials and contains different types of bacteria allowing the design of systems which address the solution to specific problems. The present invention provides the very substantial advantage in that it causes bacteria to be concentrated on specific elements in the effluent. This occurs at different locations throughout the fabric layers resulting in more rapid and more efficient bacterial breakdown. The multiple layer fabric covered device has been approved for use in several states. Because of the increase in performance and efficiency of septic systems using the device and methods disclosed herein, the costs of septic systems are halved and the area required for the leach field is one-third (⅓) the area of a leach field using conventional systems.

Figure 8:
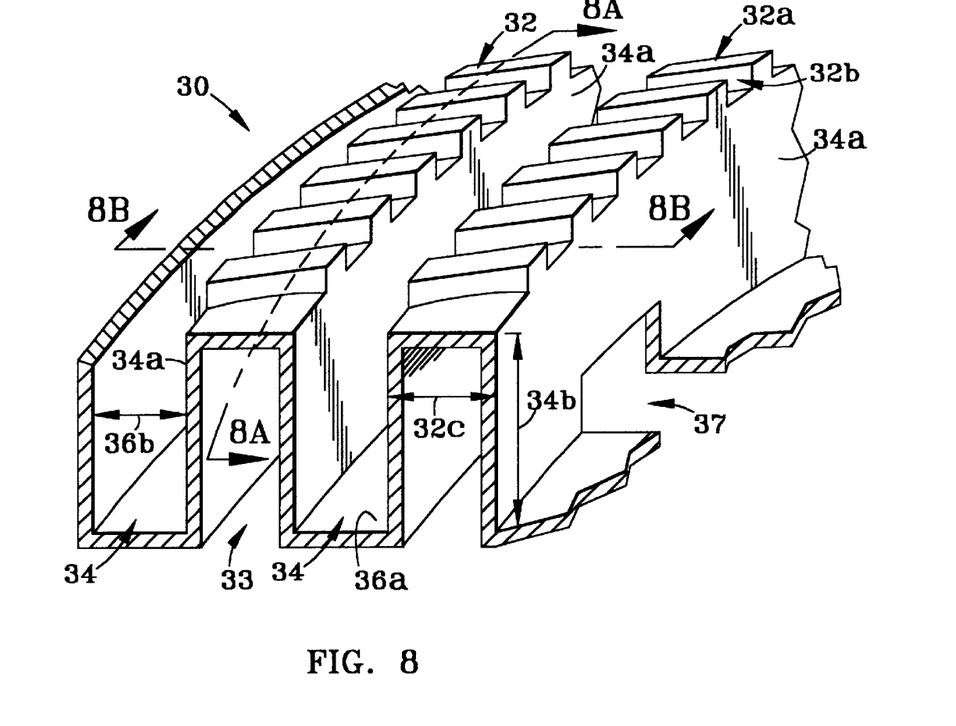
FIG. 8 is a top angled cut-off perspective view of a typical geometry of the specially configured corrugated pipe or conduit showing the details of the peaks and the valleys of the pipe detailing the relationship between the ridges, the channels between the ridges and the grooves having almost perpendicular side walls, showing also the slots cut into the bottom of the grooves and the single or multiple layer fabric which is wrapped around the pipe when placed into the ground or leach field.
Figure 8A:
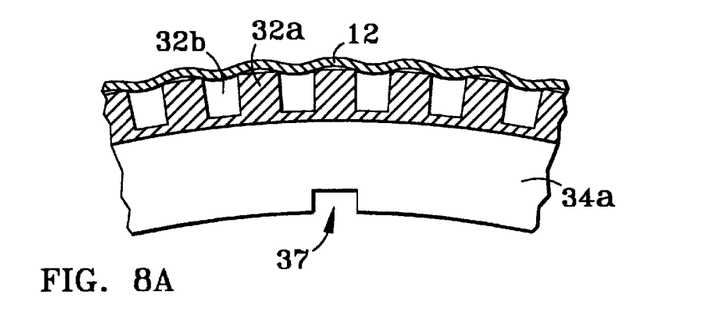
FIG. 8A is a radially directed cut-off cross section view of the pipe of FIG. 8 including the illustration of either single or multilayer fabric wrapped around the pipe.
Figure 8B:
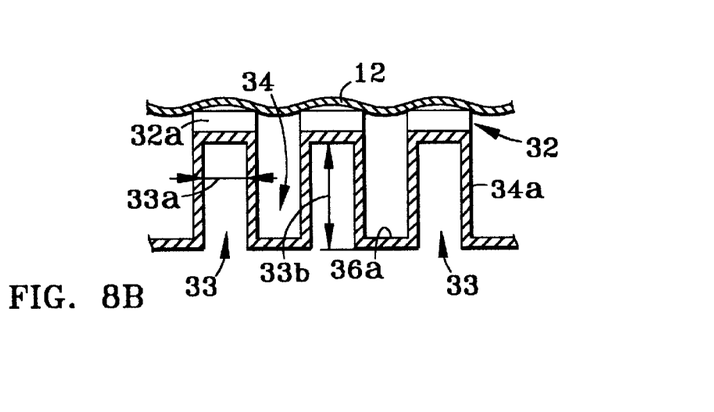
FIG. 8B is an axially directed cut-off cross section view of the pipe of FIG. 8 including the illustration of either single or multilayer fabric wrapped around the pipe.
Figure 9:
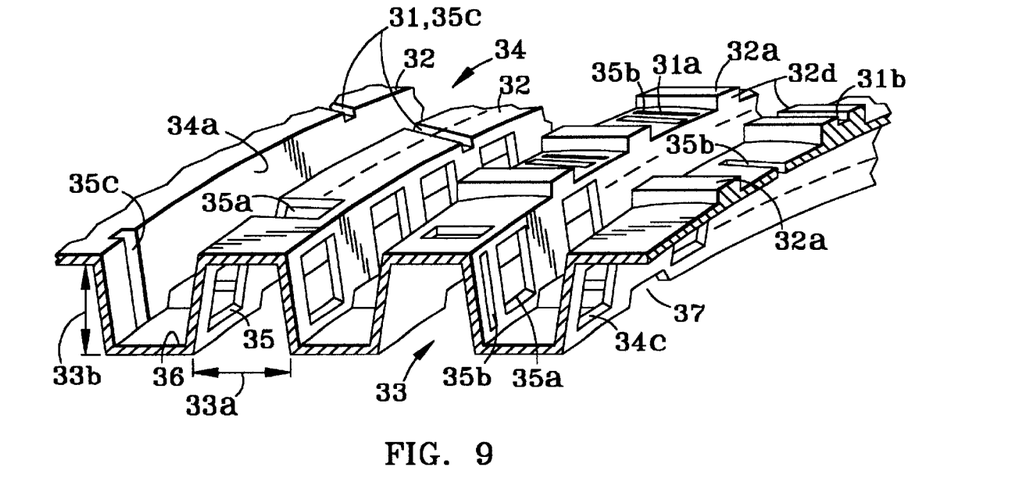
FIG. 9 is a sketch in which is illustrated variations of apertures and locations of perforations on a corrugated pipe the intent being to show the many variations for the pipe of the invention as to the perforations being slots, slits or V-grooves or combinations thereof having various directions and located in a variety of locations on the pipe including the ends of the ridges, or on the outward-facing surface of the ridges, or on the side walls of the grooves, or on the bottom portion of the groove or any combination thereof.
Figure 10:
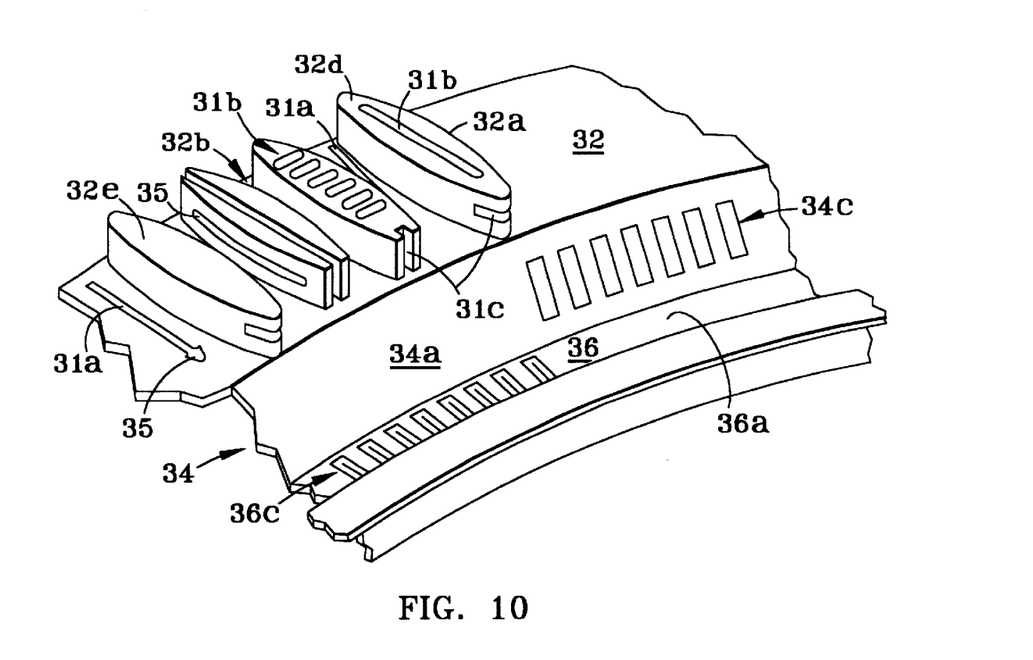
FIG. 10 is a sketch in which is illustrated various types and locations for perforations such as on the ends of the ridges, on the sides of the ridges and the top surface and including within the channels formed by the adjacent ridges.

Detailed Description of the Improved Conduit Structure Including Use with Multilayer Fabric Covering The variations depicted by the embodiments of FIGS. 8, 9 and 10 are clearly representative of many other variations of shapes for the ridges, channels, V-grooves and the like. The basic principle disclosed herein is the providing for apertures of various types and for a geometry incorporated into the pipe which results in performance and advantages listed below:

1) Due to the ridges and channels on the outer surface, the outer surface of the pipe is substantially strengthened somewhat analogous to building girders on a bridge.
2) The shape of the channels and the ridges give less mask or shadows surface where the pipe comes in contact with the outer fabric or fabrics.
3) The depth of the sidewalls not only adds strength to the pipe, but leaves room to notch the pipe from the inside using the hole boring machine patented by the inventor hereof without loosing strength.
4) The depth of the sidewall and the narrowness of the groove increase substantially the capacity for the pipe to store the sludge.
5) The angle of the sidewalls being not quite straight up and down, adds strength to the pipe and while maintaining flexibility.
6) As a consequence of the shape of the pipe, the wall thickness of the plastic may be thinner and still have greater strength than similar culvert pipe with conventional corrugation.
7) For conventional corrugated pipe using a regular hole boring machine that bores from the outside in, hole sizes larger than 5/16 of an inch would cut into the sidewalls, thereby destroying the strength of the sidewall and weakening the pipe. The hole size needed to properly allow flow and keep from clogging has to be a slot a minimum of 5/16 of an inch wide by ½ an inch long dimensions achievable with the corrugated pipe of the present invention.
8) The channels and ridges are designed so that the fabrics will not sag deep enough into the channels to cut off the flow of liquids. They are also extended far enough so that there is no cut off of liquid flow where the fabric sags into the groove.

With particular reference to FIGS. 8, 8A, 8B, 9 and 10 which figures illustrate collectively the corrugated pipe 30 i.e., the fluid conducting conduit structure for use within a drainage field of the instant invention specially configured with channels 32b and ridges 32a, grooves 34, deep groove sidewalls 34a not quite perpendicular to channels 32b and ridges 32a and to the base or valley 36 of groove 34. The relatively steep angle of side walls 34a adds strength to pipe 30 and does not negatively effect the flexibility of pipe 30. Corrugated pipe 30 may also be specially configured as above but further having perforations 35 such as slits 35b or slots 35c or V-grooves 35a cut either in the ends of the ridges, i.e., ridge end portion 32d, or on the outward-facing surface of ridges 32a, i.e., ridge outer-facing surface 32e, or on groove side walls 34a of grooves 34, or on the bottom portion of the groove, i.e., valley outward-facing surface 36a or any combination thereof.

While the pipe of the present invention may be use having either single or multilayer fabric 12 wrapped around the outside surface, it is important to note that the pipe even if it is smooth-walled, will perform the leaching functions when there are a plurality of perforations 35 through the outside wall of the pipe. If the perforations 35 are V-grooves 35a and the "v" narrows going from within the pipe toward the outer surface of the pipe, solids within the pipe will "pack" into the V of the groove keeping the solids within the pipe. However, the narrow portion of the V-grooves 35a will allow leachate to exit the pipe into the material surrounding the pipe whether it be sand or fabric. Further, because of the narrowness of the opening to the outer surface of the pipe, sand and similarly sized particles cannot enter the interior of the pipe.

The preferred configuration of the pipe of the present invention is specially configured corrugated pipe 30 which has peaks 32 and valleys 36. While conventionally known and used corrugated pipe has peaks and valleys, peaks 32 and valleys 36 of pipe 30 are geometrically distinct providing many advantages over conventional corrugated, plastic pipe.

One embodiment of pipe 30 has a plurality of ridges 32a which are situated on top of peaks 32. The orientation of the ridges may be perpendicularly directed across the peak or they may be angularly oriented ridges 32a shown in FIG. 8. Adjacent ridges 32a form channels 32b therebetween. Grooves 34 are defined by groove sidewalls 34a and valley outward-facing surface 36a. Peaks 32 have a peak width dimension 32c and valleys 36 have a valley width dimension 36b. In pipe 30 the ratio of peak width dimension 32c to valley width dimension 36b can be substantially larger than a similar ratio for conventional pipe. Notwithstanding the relatively narrow width of grooves 34, axially directed cuts or apertures 37 can be put in conduit/pipe valleys 36 using the apparatus of Applicant's U.S. Pat. No. 5,606,786 Issued Mar. 4, 1997 for "Apparatus and Method for Producing Pipe and Pipe Produced Thereby" which teaches and claims a machine and method for producing such desirable pipe. The pipe 30 has apertures 37 made from inside the pipe rather than from outside. Fabric 12 is wrapped around pipe 30 and leachate from inside pipe 30 passed out through apertures 37 into grooves 34 then into fabric 12 from not only grooves 34 but also from channels 32b thereby saturating most of the fabric where bacterial action will further treat the leachate prior to it leaving the pipe environs.

Because of the relatively large substantially vertically directed walls 34a which create grooves 34 and the relatively wide peaks 32, corrugation chambers 33 are relatively large and can contain a large amount of solids which are processed within the pipe which process produces leachate which eventually exits the pipe. Pipe 30 is more efficient in part because of the large amount of solids it can retain within leach pipe 30 and particularly within the relatively larger corrugation chambers 33.

Upon further experimentation with the pipe profile it was realized that the use of a plurality of small V-notched cuts, or just small cuts, substantially eliminates or at least reduces the need for the use of fabric around the pipe. FIGS. 9 and 10, while they do not depict a single embodiment of pipe, they illustrate in two diagrams, the variations of the instant invention pipe 30. The improved pipe of the present invention may or may not have ridges 32a and channels 32b but only peaks 32. The perforations incorporated into pipe 30 with or without ridges 32a may be all on, for example groove sidewalls 34a, perforations 34c. The perforations 35 may all be in valleys 36 and there could be any number of combinations of perforations 34c, 36c, 31 and the like.

Throughout the following description, the various forms or types of perforations on pipe 30 which will be used to allow leachate out of the interior of the pipe will be generally identified as perforations 35. These perforations 35 may have the form of V-grooves 35a, slits 35b or slots 35c. Because perforations 35 may be located at various places on pipe 30, when referring to a specific location perforations 35 may be identified such as:

1. Peak perforations 31 where a plurality of peak perforations 31 are located on peaks 32. Peak perforations 31 may be of the form of V-grooves 35a, slits 35b or slots 35c;
2. Channel perforations 31a where a plurality of channel perforations 31a are located in channels 32b. Channel perforations 31a may be of the form of V-grooves 35a, slits 35b or slots 35c;
3. Ridge outer-facing surface perforations 31b where a plurality of such are located on ridge outer-facing surfaces 32e of at least some of ridges 32a and similarly perforations 31b may be of the form of V-grooves 35a, slits 35b or slots 35c;
4. Ridge end portion perforations 31c where a plurality of such are located on ridge end portion 32d of at least some of ridges 32a and similarly perforations 31c may be of the form of V-grooves 35a, slits 35b or slots 35c;
5. Groove sidewall perforations 34c where a plurality of such are located on groove sidewalls 34a of at least some of grooves 34 and similarly perforations 34c may be of the form of V-grooves 35a, slits 35b or slots 35c; and
6. Valley perforations 36c where a plurality of such are located on outward-facing surface of valleys 36a of at least some of valleys 36 and again perforations 36c may be of the form of V-grooves 35a, slits 35b or slots 35c.

These cuts or perforations 35 could be very thin straight cuts, but would be preferable if they were V-cuts. V-grooves 35a tend to hold the sand or soils on the outside from entering quite so readily. A V-notch would give better retention of the sand and outer soils and better liquid flow out into the soils. As the soils try to enter into the pipe through the V-cut the soils will become compressed against each other maintaining the void or space. The size of the cuts could vary with the granulated size of the soils being used on the outside. These cuts could also be made in the sidewalls of the pipe as well. V-grooves 35a formed on the inside of the pipe in the valley portion 36 could actually be formed by making a detent into the bottom of the groove, i.e., valley 36 and then cutting it off from the inside. They also could be formed into the pipe as the pipe is manufactured. Remember that these cuts can be standard straight cuts 35b or 35c or V-shaped 35a, V-shaped being preferable. These cuts 31a may also go between ridges 32a inside of channels 32b. See FIGS. 9 and 10 for additional detail.

It is thought that the present invention, the improved corrugated pipe or the fluid conducting conduit structure for use within a drainage field and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A fluid conducting conduit structure, said structure comprising:
   an enclosed chamber, open at both ends, and formed of circumferentially corrugated conduit having an outer surface of a plurality of peaks and valleys;
   a plurality of axially directed apertures in each of said valleys located circumferentially within each of said valleys, each said plurality of axially directed apertures providing flow communication from conduit interior to conduit exterior; and
   a plurality of ridges spaced apart defining there between channels, said plurality of ridges and said plurality of channels being located on each said peak.

2. The fluid conducting conduit structure according to claim 1, wherein said corrugated conduit is comprised of plastic material.

3. The fluid conducting conduit structure according to claim 2 further comprising a first layer of fabric wrapped around said outer surface of said corrugated conduit resting on said plurality of ridges.

4. The fluid conducting conduit structure according to claim 3 further comprising at least one additional layer of fabric overlaying said first layer with said first layer and each said at least one additional layer of fabric having a predetermined denier and predetermined thickness, said predetermined denier of said first layer being greater than said predetermined denier of each said additional layer of fabric and each said additional layer having a denier different from each said additional layer adjacent thereto, said predetermined denier and thickness adapted to be dependent upon the fluid being treated and dispersed and the drainage field size, composition and geometry.

5. The fluid conducting conduit structure according to claim 4 wherein at least one of said layers of fabric is pretreated with at least one composition selected from the group consisting of oil digesting microbes, chemicals and bacteria.

6. The fluid conducting conduit structure according to claim 5 wherein at least said first layer of fabric is formed from an unstructured assemblage of fibers, said unstructured assemblage of fibers supported by outer sheeting where oils, greases and chemicals contained in the fluids to be treated and entering within said fluid conducting conduit structure are entrapped within at least one of said first layer and said at least one additional layer of fabric on said unstructured assemblage of fibers, which said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

7. The fluid conducting conduit structure according to claim 4 wherein at least said first layer of fabric is formed from an unstructured assemblage of fibers, said unstructured assemblage of fibers supported by outer sheeting where oils, greases and chemicals contained in the fluids to be treated and entering within said fluid conducting conduit structure are entrapped within at least one of said first layer and said at least one additional layer of fabric on said unstructured assemblage of fibers, which said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

8. The fluid conducting conduit structure according to claim 3 wherein said first layer of fabric is pretreated with at least one composition selected from the group consisting of oil digesting microbes, chemical and bacteria.

9. The fluid conducting conduit structure according to claim 8 wherein said first layer of fabric is formed from an unstructured assemblage of fibers, said unstructured assembalge of fibers supported by outer sheeting where oils, greases and chemical contained in the fluids to be treated and entering within said fluid conducting conduit structure are entrapped within said first layer, wherein said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

10. The fluid conducting conduit structure according to claim 3 wherein said first layer of fabric is formed from an unstructured assemblage of fibers, said unstructured assemblage of fibers supported by outer sheeting where oils, greases and chemicals contained in the fluids to be treated and entering within said fluid conducting conduit structure are entrapped within said first layer, wherein said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

11. A fluid conducting conduit structure, said structure comprising:
  an enclosed chamber, open at both ends, and formed of circumferentially corrugated conduit having an outer surface of a plurality of peaks, a plurality of valleys, a plurality of grooves, said grooves defined by groove sidewalls and said valleys; and
  a plurality of perforations, wherein the form of at least one of said plurality of perforations is selected from the group of forms of perforations consisting of: V-grooves, slits and slots, said plurality of perforations being located in at least one of the locations on said corrugated conduit selected from the group of locations consisting of: said valleys, said peaks and said groove sidewalls.

12. The fluid conducting conduit structure according to claim 11 further comprising a first layer of fabric wrapped around said outer surface of said corrugated conduit resting on said plurality of peaks and wherein said corrugated conduit is comprised of plastic material.

13. The fluid conducting conduit structure according to claim 12 further comprising ridges formed on said peaks, said ridges having a ridge outer-facing surface, a ridge end portion and a ridge side portion, pairs of adjacent ridges and opposed facing ridge side portions forming thereby a channel, each said ridge having a ridge axis angularly oriented at a predetermined angle relative to the conduit axis, said predetermined angle between about zero degrees (0°) and about ninety degrees (90°) and wherein said at least one of the locations for said perforations further includes at least one location selected from the group further consisting of said channels, said ridge outer-facing surface and said ridge end portion.

14. The fluid conducting conduit structure according to claim 13 further comprising at least one additional layer of fabric overlaying said first layer with said first layer and each said at least one additional layer of fabric having a predetermined denier and predetermined thickness, said predetermined denier of said first layer being greater than said predetermined denier of each said additional layer of fabric and each said additional layer having a denier different from each said additional layer adjacent thereto, said predetermined denier and thickness adapted to be dependent upon the fluid being treated and dispersed and the drainage field size, composition and geometry.

15. The fluid conducting conduit structure according to claim 14 wherein at least one of said layers of fabric is pretreated with at least one composition selected from the group consisting of oil digesting microbes, chemicals and bacteria.

16. The fluid conducting conduit structure according to claim 14 wherein at least said first layer of fabric is formed from an unstructured assemblage of fibers, said unstructured assemblage of fibers supported by outer sheeting where oils, greases and chemicals contained in the fluids to be treated and entering within said fluid conducting conduit structure are entrapped within at least one of said first layer and said at least one additional layer of fabric on said unstructured assemblage of fibers, which said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

17. The fluid conducting conduit structure according to claim 12 further comprising at least one additional layer of fabric overlaying said first layer with said first layer and each said at least one additional layer of fabric having a predetermined denier and predetermined thickness, said predetermined denier of said first layer being greater than said predetermined denier of each said additional layer of fabric and each said additional layer having a denier different from each said additional layer adjacent thereto, said predetermined denier and thickness adapted to be dependent upon the fluid being treated and dispersed and the drainage field size, composition and geometry.

18. The fluid conducting conduit structure according to claim 17 wherein at least one of said layers of fabric is pretreated with at least one composition selected from the group consisting of oil digesting microbes, chemicals and bacteria.

19. The fluid conducting conduit structure according to claim 17 wherein at least said first layer of fabric is formed from an unstructured assemblage of fibers, said unstructured assemblage of fibers supported by outer sheeting where oils, greases and chemicals contained in the fluids to be treated and entering within said fluid conducting conduit structure are entrapped within at least one of said first layer and said at least one additional layer of fabric on said unstructured assemblage of fibers, which said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

20. The fluid conducting conduit structure according to claim 11 further comprising ridges formed on said peaks, said ridges having a ridge outer-facing surface, a ridge end portion and a ridge side portion, pairs of adjacent ridges and opposed facing ridge side portions forming thereby a channel, each said ridge having a ridge axis angularly oriented at a predetermined angle relative to the conduit axis, said predetermined angle between about zero degrees (0°) and about ninety degrees (90°) and wherein said at least one of the locations for said perforations further includes at least one location selected from the group further consisting of said channels, said ridge outer-facing surface and said ridge end portion.

\* \* \* \* \*